United States Patent [19]

Tsunoda et al.

[11] 4,412,779
[45] Nov. 1, 1983

[54] CONTROL METHOD FOR MULTI-STAGE HYDRAULIC MACHINE

[75] Inventors: Sachio Tsunoda, Yokohama; Shinsaku Sato, Ebina, both of Japan

[73] Assignee: Tokyo Shibaura Denki Kabushiki Kaisha, Kawasaki, Japan

[21] Appl. No.: 343,215

[22] Filed: Jan. 27, 1982

[30] Foreign Application Priority Data

Feb. 3, 1981 [JP] Japan .................. 56-13799

[51] Int. Cl.³ .......................................... F01D 17/00
[52] U.S. Cl. ........................................ 415/1; 415/500
[58] Field of Search .................................. 415/500, 1

[56] References Cited

U.S. PATENT DOCUMENTS

| 3,238,534 | 3/1966 | Hartland | 415/1 X |
| 3,309,057 | 3/1967 | Tonooka | 415/1 |
| 3,507,603 | 4/1970 | Von Widdern | 415/1 X |
| 4,014,624 | 3/1977 | Takase et al. | 415/1 |
| 4,158,525 | 6/1979 | Kawase et al. | 415/500 X |

FOREIGN PATENT DOCUMENTS 54-114648 6/1979 Japan .
54-142436 11/1979 Japan .................. 415/500

Primary Examiner—Philip R. Coe
Assistant Examiner—Thomas W. Epting
Attorney, Agent, or Firm—Oblon, Fisher, Spivak, McClelland & Maier

[57] ABSTRACT

A multi-stage hydraulic machine comprises a rotatable shaft; a plurality of runners fixed to the shaft and arranged from a highest-pressure stage to a lowest-pressure stage; runner chambers in which are respectively housing the runners; a return channel for connecting adjacent ones of said runner chambers with each other; movable wicket gates provided at least in the highest-pressure stage and capable of moving between a position in which the movable wicket gates block the channel and a position in which the movable wicket gates open the channel; and a casing connected to the highest-pressure stage. In a control method for the hydraulic machine, the wicket gates are closed and highly pressurized water is fed through a feed pipe in an outer circumferential portion of the runner chamber of the highest-pressure stage defined inside of the movable wicket gates, said water sequentially reaching the lower pressure stages through the return channels. The air at the central portion of each of the stages is then exhausted in a sequential manner from the highest-pressure stage to the lowest-pressure stage.

9 Claims, 5 Drawing Figures

CONTROL METHOD FOR MULTI-STAGE HYDRAULIC MACHINE

BACKGROUND OF THE INVENTION

The present invention relates to a control method for a multi-stage hydraulic machine having a plurality of stages from the highest-pressure stage to the lowest-pressure stage, and more particularly to a control method for a multi-stage hydraulic machine in which the runner chambers of adjacent stages communicate with each other through a return channel and at lowest-pressure stage is provided with movable wicket gates, the control method being applicable to the period of time during which the mode of operation is shifted from the idling operation to the power generating operation or the pumping operation.

In single-stage hydraulic machines used in pumped storage power plants, highly pressurized air is in general fed by a water level depressor to a point above the water level at the upper part of a suction pipe in order to reduce the torque for driving a runner during the turbine condenser operation or the pump starting operation. The air thus fed causes the water level to go down so that the runner is operated in the air. Thereafter, the air fed into the channel path is exhausted and the water level goes up and then the flow path is filled with water. In this manner, the hydraulic machine is changed in mode of operation to a predetermined turbine generating or pumping operation.

In a multi-stage hydraulic machine having a plurality of stages, the runner chambers of adjacent stages communicate with each other through a return channel. Therefore, the multi-stage hydraulic machine has a complicated channel system. Thus, various difficulties are found in the air exhausting operation when the idling operation is shifted to the power generating operation or the pumping operation.

Particularly in the case of a multi-stage hydraulic machine provided with movable wicket gates in the highest-pressure stage in order to safely control the driven condition during this transition, the channels of the respective stages from the highest-pressure stage to the lowest-pressure stage are in constant communication with each other. Consequently, when the air remaining in the channels is exhausted, mutual interference occurs among the respective stages. Thus, it is difficult to carry out smoothly the air-exhausting/water-filling operation and there arises a problem of exhaustion of the residual water.

Multi-stage hydraulic machines provided with movable wicket gates in their highest-pressure stage have not been extensively developed from the technical point of view. In fact, no convenient and proper control method for such machine has been yet proposed that is applicable in the case where the idling operation is changed to a predetermined power generating or pumping operation.

SUMMARY OF THE INVENTION

The present invention has been made in consideration of above mentioned circumstances and has for its object to provide a control method for a multi-stage hydraulic machine according to which while the idling operation is changed to the power generating operation or the pumping operation, air can be reliably exhausted during a short period of time and a smooth shift to the power generating operation or the pumping operation is ensured.

According to an aspect of the present invention, there is provided a control method for a multi-stage hydraulic machine which comprises a rotatable shaft; a plurality of runners fixed to the shaft and arranged from a highest-pressure stage to a lowest-pressure stage; runner chambers in which are respectively housing said runners; a return channel for connecting adjacent ones of the runner chambers with each other; movable wicket gates provided at least in the highest-pressure stage and capable of moving between a position in which the movable wicket gates block the channel and a position in which the movable wicket gates open the channel; and a casing connected to the highest-pressure stage, the method comprising a first step of causing the movable wicket gates to block the channel;

a second step of feeding air to the runner chamber of the highest-pressure stage to lower a water level in the channel below the runner chamber of the lowest-pressure stage;

a third step of idling the shaft; and a fourth step of shifting a mode of operation of said shaft to a turbine generating or pumping operation, the fourth step including a first process of feeding highly pressurized water in the casing through a feed water pipe to an outer circumferential portion of the runner chamber of the highest-pressure stage defined inside of the movable wicket gates when the movable wicket gates are completely closed, whereby the runner chamber of the highest-pressure stage is sequentially filled with water from the outer circumferential portion to a middle portion thereof and consequently the air remaining therein is compressed;

a second process of feeding the water in the runner chamber of the highest-pressure stage through the return channel to the lower-pressure stages sequentially;

a third process of initiating exhaustion of compressed air in the runner chamber of the highest-pressure stage when the return chamber adjacent to the runner chamber of the highest-pressure stage is substantially filled with water;

a fourth process of stopping exhaustion of the compressed air when the runner chamber of the highest-pressure stage reaches an underwater cut-off state and simultaneously initiating exhaustion of the compressed air from the runner chamber of the adjacent lower-pressure stages sequentially;

a fifth process of stopping exhaustion of the compressed air when each runner chamber of the lower-pressure stage reaches the underwater cut-off state;

a sixth process of terminating feeding of the highly pressurized water from the casing when the water pressure in the runner chamber of the highest-pressure stage reaches a predetermined level; and a seventh process of driving the movable wicket gates to a predetermined opening.

In accordance with the present invention, each of the exhaust valves is first completely closed, while highly pressurized water in the casing is supplied to the outer circumferential portion of the runner chamber of the highest-pressure stage. Then, with the remaining air being sealed in the channel, the runner chamber of the highest-pressure stage and the return channel adjacent thereto are filled with water. Then, the supplied highly pressurized water is placed under a proper pressure due to the centrifugal force produced by the runner in the runner chamber of the highest-pressure stage. Therefore, the remaining air can be sequentially compressed from the outer circumferential portion to the middle portion of the runner chamber of the highest-pressure stage without fluctuations in pressure. As a result, the water-filled area can be smoothly formed. On the other hand, in that portion of the return channel which is below the runner chamber of the highest-pressure stage, the flow path has a complicated shape, so that fluctuations in the water level and in water pressure readily occur while water is being filled. However, water fed from upstream after having been placed under the proper pressure sequentially compresses air upward due to the centrifugal force produced by the runner of the adjacent lower-pressure stage while water accumulates in the lower portion. Consequently, smooth filling of water is ensured without fluctuations in the water level or in water pressure as mentioned above.

In addition, the water-filled area is formed in the return channel below the runner chamber of the highest-pressure stage, so that the remaining air is moved to the portion above the runner chamber of the highest-pressure stage and suitably pressurized therein. The exhaustion of the compressed air is initiated in this condition so that the air can be properly and rapidly exhausted from the highest-pressure stage.

In this manner, the compressed air is exhausted from the runner chamber of the highest-pressure stage and simultaneously the water is fed from the upward portion of the return channel to the outer circumferential portion of the runner chamber of the adjacent lower-pressure stage. This water sequentially compresses the air remaining in the runner chamber of each lower-pressure stage under the centrifugal force produced by the runner of the corresponding lower-pressure stage and thus the water-filled area is smoothly formed. When the runner chamber of the highest-pressure stage reaches the underwater cut-off state, the air remaining in the runner chamber of the corresponding lower-pressure stage which is under proper pressure is exhausted. Therefore, as in the case of the highest-pressure stage, exhaustion of air of the lower-pressure stages may be performed smoothly and quickly.

In other words, pressurized water is injected into the outer circumferential portion of each runner chamber of each stage from the channel situated on the higher-pressure side communicating therewith. Then, the air remaining in this runner chamber is sequentially compressed from the outer circumferential portion thereof and exhausted when the compressed air is moved to the central portion. In this way, every stage is sequentially filled with water from the highest-pressure stage to the lowest-pressure stage. Consequently, in accordance with the present invention, the air-exhausting/water-filling operation may be smoothly, rapidly and reliably carried out even in multi-stage hydraulic machine having complicated water channel structures.

DETAILED DESCRIPTION OF THE PREFERRED EMBODIMENTS

Figure 1:
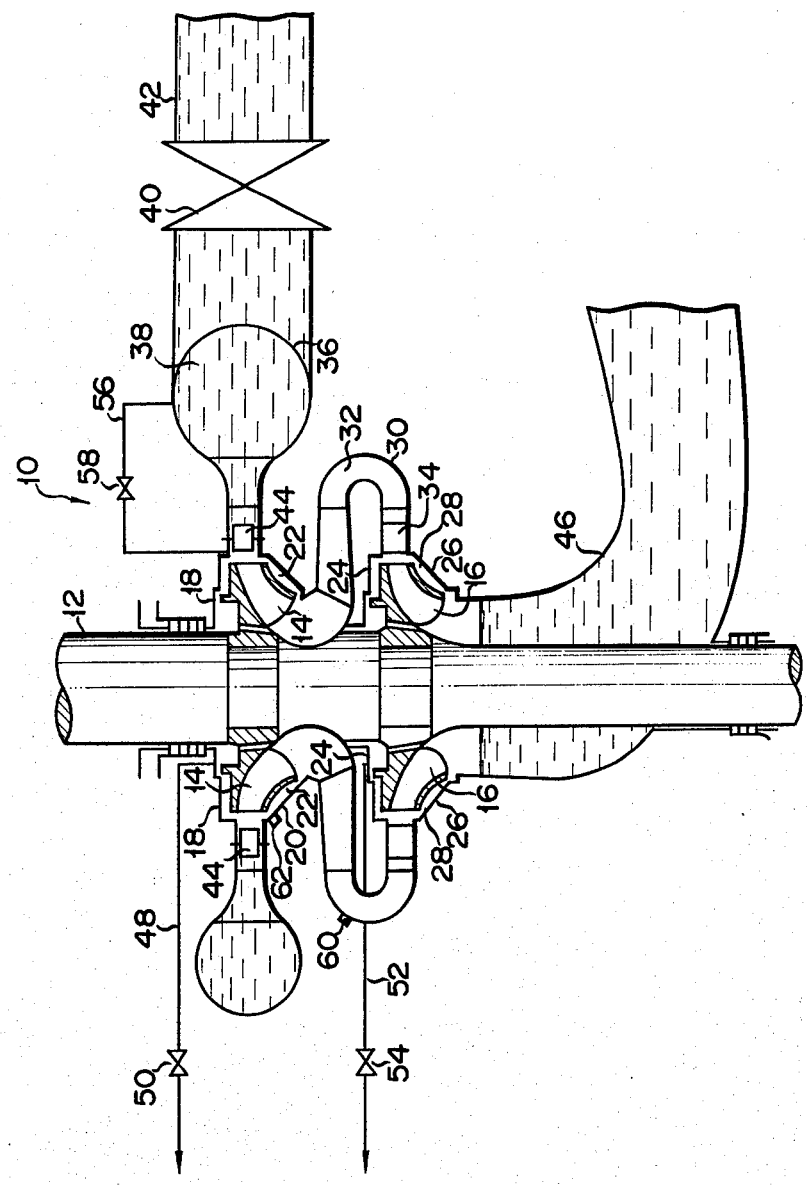
FIG. 1 is a longitudinal sectional view schematically showing a two-stage Francis type reversible pump turbine in an idling operation mode according to a first embodiment of a control method of the present invention.
Figure 2:
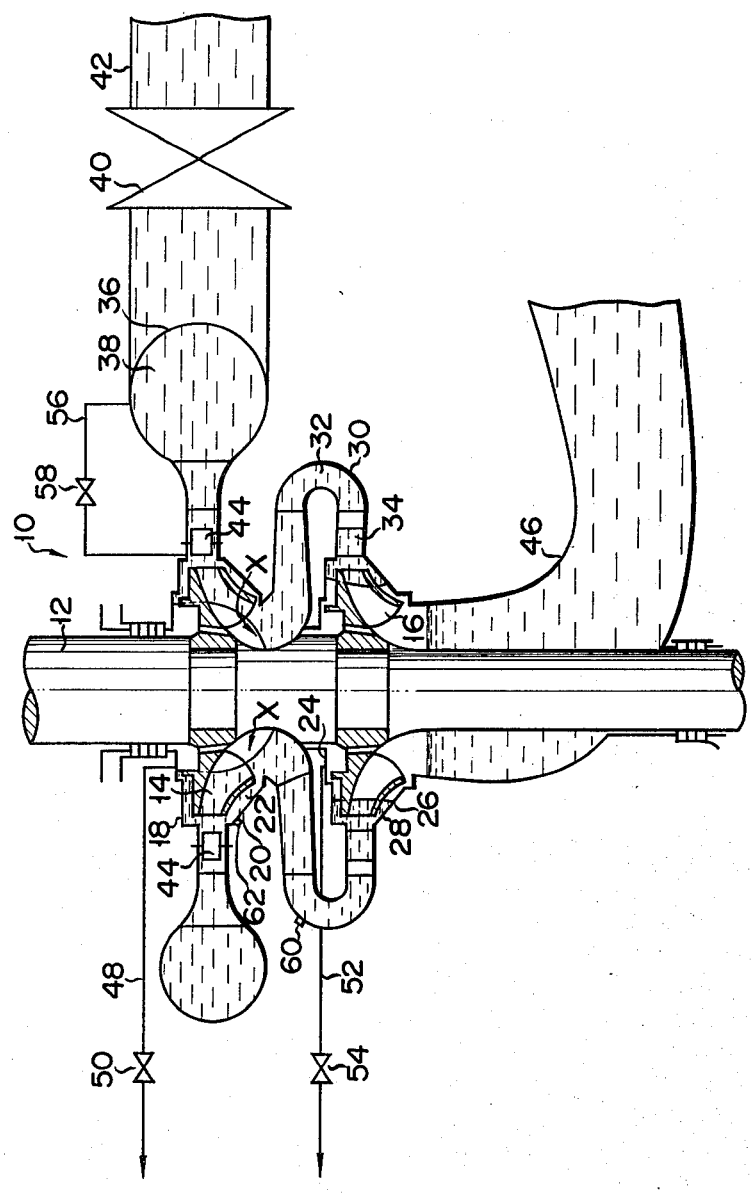
FIG. 2 is a longitudinal sectional view showing the pump turbine of FIG. 1 in a water-filling/air-exhausting operation mode.

A first embodiment of a control method for a multi-stage hydraulic machine according to the present invention will be described in detail below with reference to FIGS. 1 to 3.

Referring to a construction of a multi-stage hydraulic machine used in this embodiment, a two-stage Francis type reversible pump turbine 10 is used as the multi-stage hydraulic machine. The pump turbine 10 has a main shaft 12 rotatably disposed along the vertical direction. To this shaft 12 are mounted a high-pressure stage runner 14 and a low-pressure stage runner 16. The runners 14 and 16 are spaced apart from each other by a predetermined distance along the direction of the axis of the main shaft 12. The main shaft 12, the high-pressure stage runner 14 and the low-pressure stage runner 16 constitute movable members.

Stationary members are provided around the movable members mentioned above. These stationary members are fixed underground in concrete. The stationary members comprise a first upper cover 18 and a first lower ring 20 which define a high-pressure stage runner chamber 22 therebetween. The high-pressure stage runner 14 is housed in the high-pressure stage runner chamber 22. Below the first lower ring 20 are disposed a second upper cover 24 and a second lower ring 26 which define a low-pressure stage runner chamber 28 therebetween. The low-pressure stage runner 16 is housed in this low-pressure stage runner chamber 28. The high-pressure stage runner chamber 22 communicates with the low-pressure stage runner chamber 28 through a return channel 30. A return vane 32 is disposed substantially at the central position of the return channel 30. A stay vane 34 is disposed in the portion of the return channel 30 where it is open to the low-pressure stage runner chamber 28.

A spiral casing 36 is disposed outside the high-pressure stage runner chamber 22. The interior of this spiral casing 36 defines a vortex chamber 38. The outlet of the vortex chamber 38 and the high-pressure stage runner chamber 22 communicate with each other. The inlet of the vortex chamber 38 is connected through an inlet valve 40 to a penstock 42 which is connected to an upper reservoir (not shown). A plurality of movable wicket gates 44 are disposed in the water channel outside the high-pressure stage runner 14. The movable wicket gates 44 are coaxial with the main shaft 12 and pivotal between a position in which they close the water channel and a position in which they open it. The opening of the movable wicket gates 44 is defined by a wicket gate actuator mechanism (not shown).

One end of an elbow-shaped draft tube 46 is connected to the low-pressure stage runner chamber 28.

The other end of the draft tube 46 is in communication with a tailrace (not shown) which is connected to a lower reservoir (not shown).

A first exhaust pipe 48 is connected to the first upper cover 18 which defines the high-pressure stage runner chamber 22. The first exhaust pipe 48 communicates with the outer atmosphere through a first exhaust valve 50. On the other hand, a second exhaust pipe 52 is connected to the second upper cover 24 which defines the low-pressure stage runner chamber 28. This second exhaust pipe 52 communicates with the outer atmosphere through a second exhaust valve 54. The vortex chamber 38 and the high-pressure stage runner chamber 22 are directly connected to each other by a feed water pipeline 56. A feed water valve 58 is arranged in the feed water pipeline 56. Furthermore, a water level depressor (not shown) is connected to the high-pressure stage runner chamber 22.

When the reversible pump turbine 10 with the above structure is operated as a turbine, all of the valves 50, 54 and 58 are closed. In this condition, water flows from the upper reservoir as pressurized water in the vortex chamber 38 of the spiral casing 36 through the penstock 42 and the inlet valve 40. The pressurized water passes through the movable wicket gates 44 and impinges on the high-pressure stage runner 14, so that the main shaft 12 rotates. Thereafter, the pressurized water flows through the return channel 30 and impinges on the low-pressure stage runner 16, so that the main shaft 12 rotates further. Thereafter, the water flows through the draft tube 46 and finally is exhausted to the lower reservoir.

On the other hand, if the reversible pump turbine 10 is operated as a pump, a motor (not shown) rotates the main shaft 12 at the same rotational speed as in the previous case in which it is operated as a turbine, but in the opposite direction. Therefore, the water pumped up by the low-pressure stage runner 16 is further urged by the high-pressure stage runner 14 and directed to the upper reservoir along the route reverse to that in the former case where the reversible pump turbine 10 is operated as a turbine.

The following detailed description will be given to explain the control method for the reversible pump turbine 10 discussed above when it is changed from the state in which the main shaft 12 is idled in the direction required for power generation to the state in which the reversible pump turbine 10 is operated to generate power.

Prior to the idling operation, the movable wicket gates 44 are first completely closed. Then, the inlet valve 40 is opened so that pressurized water is filled in the vortex chamber 38. Thereafter, compressed air is fed into the high-pressure stage runner chamber 22 through the water level depressor, whereby the water within the high-pressure stage runner chamber 22 is pressed down through the return channel 30 and the low-pressure stage runner chamber 28 into the draft tube 46, as shown in FIG. 1. In the condition shown in FIG. 1, the main shaft 12 starts to idle for generation of power.

In order to change the mode of operation from idling to power generation, the feed water valve 58 is first opened. As a result, highly pressurized water in the spiral casing 36 is fed through the feed water pipeline 56 to the outer circumferential portion of the high-pressure stage runner chamber 22 situated inside the completely closed movable wicket gates 44. This water compresses the air remaining in the channel, so that the high-pressure stage runner chamber 22 is gradually filled with water from the outer circumferential portion to the central portion thereof. On the other hand, the water fed to the high-pressure stage runner chamber 22 is now supplied through the return channel 30 to the low-pressure stage runner chamber 28 to fill it. As shown in FIG. 2, the first exhaust valve 50 is opened when the high-pressure stage runner chamber 22 and the return channel 30 adjacent thereto are nearly filled with water. Then, the compressed air (indicated by symbol X in FIG. 2) remaining in the high-pressure stage runner chamber 22 is released through the first exhaust pipe 48.

Figure 3:
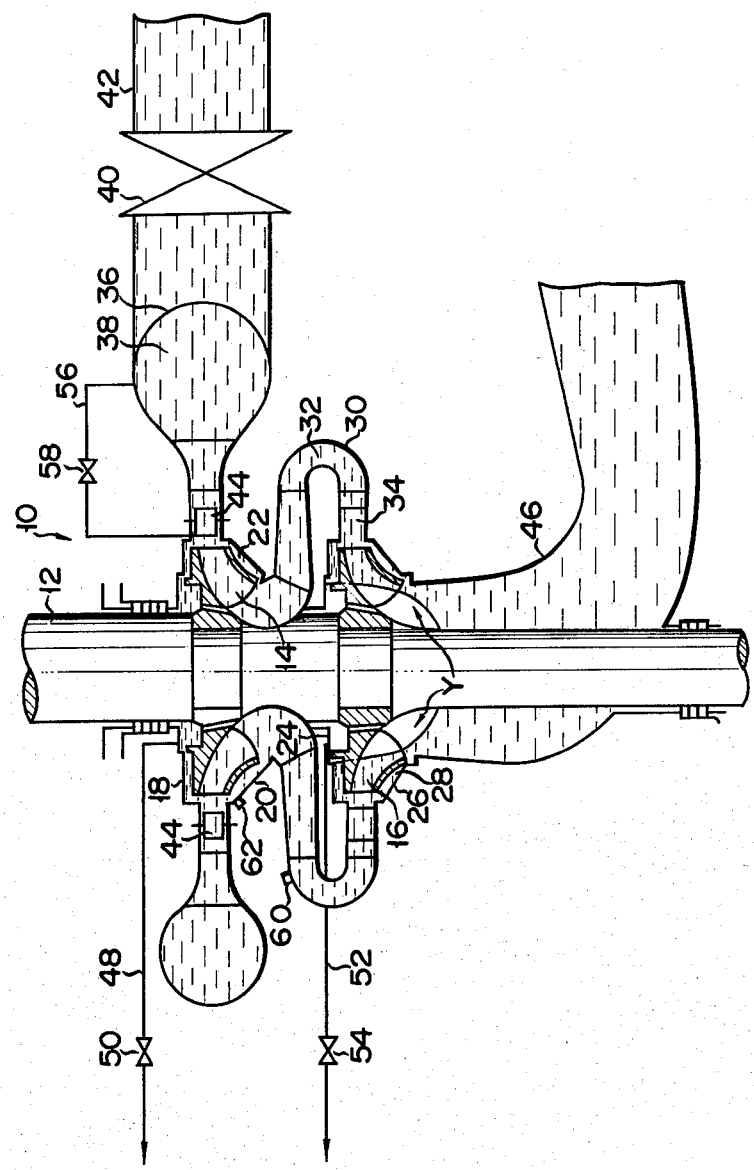
FIG. 3 is a longitudinal sectional view showing the pump turbine of FIG. 1 in a power generating operation mode.

Thereafter, the second exhaust valve 54 is opened when the high-pressure stage runner chamber 22 has reached the underwater cut-off state as shown in FIG. 3. Consequently, the compressed air (indicated by symbol Y in FIG. 3) in the low-pressure stage runner chamber 28 is exhausted through the second exhaust pipe 52.

When the water in the high-pressure stage runner chamber 22 reaches a predetermined level, the feed water valve 58 is completely closed. Therefore, the feeding of the highly pressurized water from the spiral casing 36 is stopped. Simultaneously, the first and second exhaust valves 50 and 54 are completely closed. Then, the movable wicket gates 44 are gradually brought to a predetermined opening through a drive mechanism (not shown) to establish communication between the high-pressure stage runner chamber 22 and the spiral casing 36 through the movable wicket gates 44. Generation of power is thus initiated. In this manner, the idling operation mode is smoothly shifted to the power generating operation mode.

It is to be noted that the level to which the water is filled in the return channel 30 adjacent the high-pressure stage runner chamber 22 is detected through a pressure detector 60 which is arranged in this return channel 30. The first exhaust valve 50 is opened in response to a detection signal from the pressure detector 60. Another pressure detector 62 which is arranged in the high-pressure stage runner chamber 22 detects when the water pressure in the high-pressure stage runner chamber 22 reaches the underwater cut-off state and a predetermined value. The feed water valve 58 is opened in response to a detection signal from this detector 62.

The control method during transition from the idling operation to the power generating operation is as described above. The change of mode from the idling operation to the pumping operation can be accomplished in the same manner as in the control method for changing from the idling operation to the power generating operation as described above except that the main shaft 12 rotates in the reverse direction.

The present invention is not limited to the particular embodiment as described above and various changes and modifications may be made without departing from the scope and spirit of the present invention.

Figure 4:
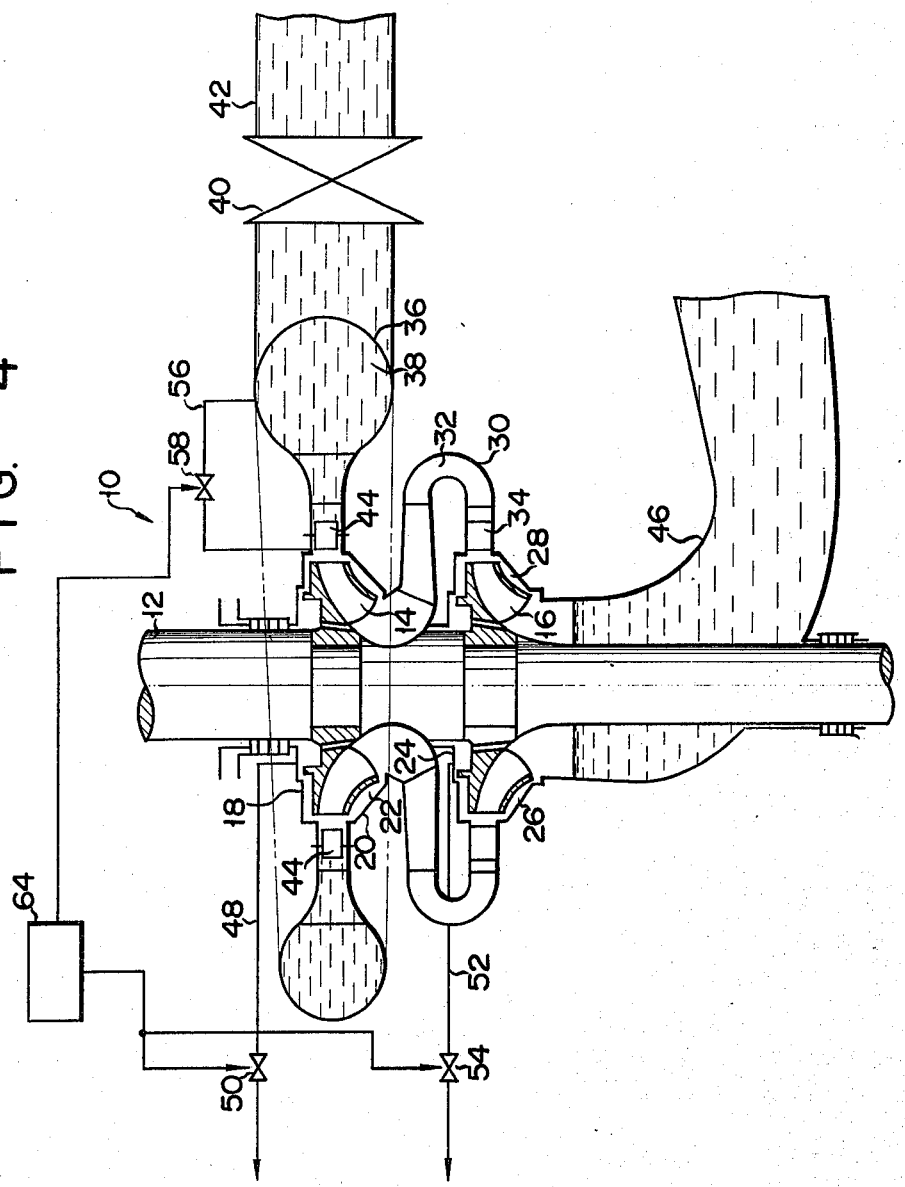
FIG. 4 is a longitudinal sectional view showing a two-stage Francis type reversible pump turbine in the idling operation mode according to a second embodiment of the control method of the present invention.

In the embodiment described above, the levels of water filled in the high-pressure stage runner chamber 22 and in the return channel 30 are respectively detected by the respective pressure detectors, and the opening/closing operations of the valves are controlled depending upon the detection results. However, in a second embodiment as shown in FIG. 4, a predetermined period of time which is required to fill water in each of the return channels 30 and the respective stages may be computed in advance and a timer device 64 may be used to control the opening/closing operations of the valves.

Figure 5:
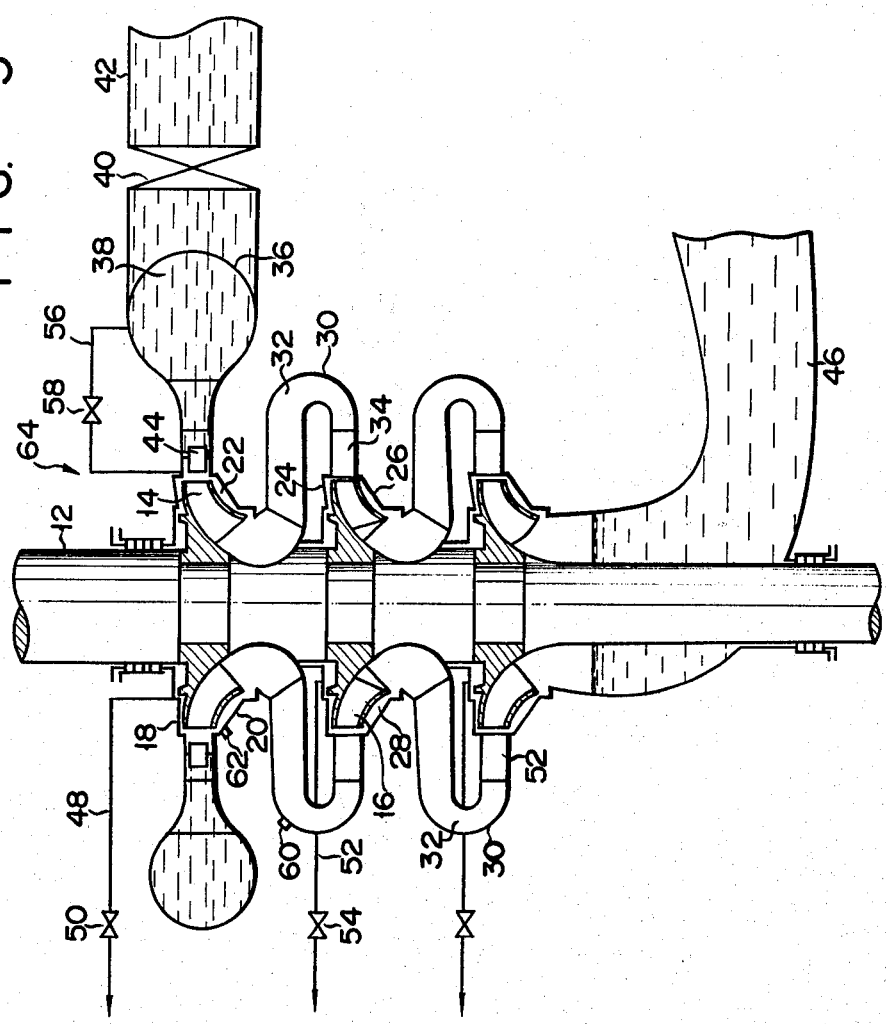
FIG. 5 is a longitudinal sectional view schematically showing a three stage Francis type reversible pump turbine in an idling operation mode according to a third embodiment of a control method of the present invention.

Although the control method for a two-stage Francis type reversible pump turbine has been discussed in the previous embodiments, the present invention may also be applied to a multi-stage pump turbine which comprises more than two stages. For example, the control method may be applied to a three-stage Francis type reversible pump turbine according to a third embodiment as shown in FIG. 5. In this case, the highly pressurized water in the spiral casing 36 is sequentially injected from the higher-pressure stage. After the higher-pressure stage is filled with water and the underwater cut-off state is accomplished, the remaining air is exhausted from the lower-pressure stage adjacent to the corresponding higher-pressure stage. In this manner, the water-filling and air-exhausting operations are sequentially smoothly carried out from the highest-pressure stage toward each lower-pressure stage.

In addition, the present invention may be applied not only to pump turbines, but also to pumps, turbines and other hydraulic machines. In the above embodiments, the movable wicket gates are disposed in the highest-pressure stage runner chamber. However, the movable wicket gates may alternatively be disposed in each of the lower-pressure stage runner chamber. In this case, the movable wicket gates without ones in the highest-pressure stage runner chamber is opened.

What we claim is:

1. A control method for a multi-stage hydraulic machine which comprises a rotatable shaft; a plurality of runners fixed to said shaft and arranged from a highest-pressure stage to a lowest-pressure stage; runner chambers in which are respectively housing said runners; a return channel for connecting adjacent ones of said runner chambers with each other; movable wicket gates provided at least in said highest-pressure stage and capable of moving between a position in which said movable wicket gates block the channel and a position in which said movable wicket gates open the channel; and a casing connected to said highest-pressure stage, said method comprising
   a first step of causing said movable wicket gates to block the channel;
   a second step of feeding air to said runner chamber of the highest-pressure stage to lower a water level in the channel below said runner chamber of the lowest-pressure stage;
   a third step of operating upon said machine for idling said shaft in a direction for the desired mode of machine operation; and
   a fourth step of shifting a mode of operation of said shaft to a turbine generating or pumping operation, said fourth step including
   a first process of feeding highly pressurized water in said casing through a feed water pipe to an outer circumferential portion of said runner chamber of the highest-pressure stage defined inside of said movable wicket gates when said movable wicket gates are completely closed, whereby said runner chamber of the highest-pressure stage is sequentially filled with water from the outer circumferential portion to a middle portion thereof and consequently the air remaining therein is compressed;
   a second process of feeding the water in said runner chamber of the highest-pressure stage through said return channel to the lowest-pressure stages sequentially;
   a third process of initiating exhaustion of compressed air in said runner chamber of the highest-pressure stage when said return channel adjacent to said runner chamber of the highest-pressure stage is substantially filled with water;
   a fourth process of stopping exhaustion of the compressed air when said runner chamber of the highest-pressure stage reaches an underwater cut-off state and simultaneously initiating exhaustion of the compressed air from said runner chamber of the adjacent lower-pressure stages sequentially;
   a fifth process of stopping exhaustion of the compressed air when each runner chamber of the lower-pressure stage reaches the underwater cut-off state;
   a sixth process of terminating feeding of the highly pressurized water from said casing when the water pressure in said runner chamber of the highest-pressure stage reaches a predetermined level; and
   a seventh process of driving said movable wicket gates to a predetermined opening.

2. The control method for a multi-stage hydraulic machine according to claim 1, wherein, in said third process, the condition in which said return channel adjacent to said runner chamber of the highest-pressure stage is filled with water is detected by the fact that the water pressure in said return channel reaches a predetermined level.

3. The control method for a multi-stage hydraulic machine according to claim 2, wherein, in said fourth process, the condition in which said runner chamber of the highest-pressure stage reaches the underwater cut-off state is detected by the fact that the water pressure therein reaches a predetermined level.

4. The control method for a multi-stage hydraulic machine according to claim 3, wherein, in said fourth process, the condition in which said runner chamber of each lower-pressure stage reaches the underwater cut-off state is detected by the fact that the water pressure therein reaches a predetermined level.

5. The control method for a multi-stage hydraulic machine according to claim 4, wherein, in said sixth process, the predetermined pressure of said runner chamber of the highest-pressure stage is defined by a resultant force of the pressures in said runner chambers of the respective stages in the underwater cut-off state.

6. The control method for a multi-stage hydraulic machine according to claim 1, wherein, in said third process, the condition in which said return channel adjacent to said runner chamber of the highest-pressure stage is filled with water is detected by the fact that a predetermined time has elapsed from said first process.

7. The control method for a multi-stage hydraulic machine according to claim 6, wherein, in said fourth process, the condition in which said runner chamber of the highest-pressure stage reaches the underwater cut-off stage is detected by the fact that a predetermined time has elapsed from said third process.

8. The control method for a multi-stage hydraulic machine according to claim 7, wherein, in said fifth process, the condition in which said runner chamber of each lower-pressure stage reaches the underwater cut-off stage is detected by the fact that a predetermined time has elapsed from said fourth process.

9. The control method for a multi-stage hydraulic machine according to claim 8, wherein, in said sixth process, the condition in which the highest-pressure stage reaches the predetermined pressure is detected by the fact that a predetermined time has elapsed from the fifth process.

* * * * *